L. M. BUCHANAN.
MOTOR VEHICLE.
APPLICATION FILED FEB. 26, 1913.
1,090,132.
Patented Mar. 17, 1914.
4 SHEETS—SHEET 2.
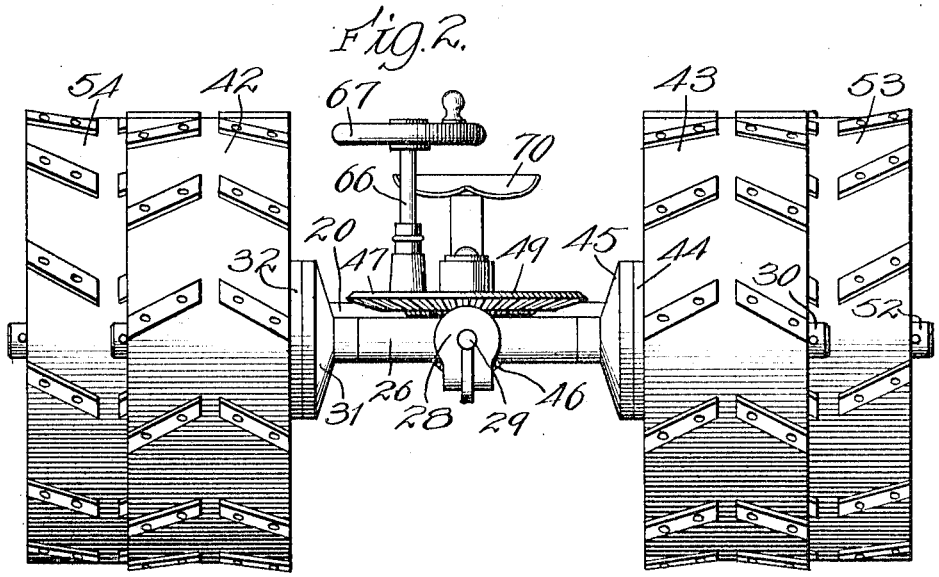
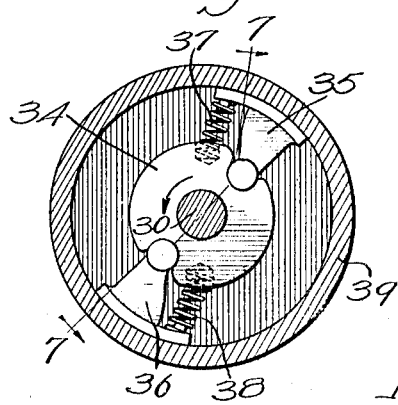
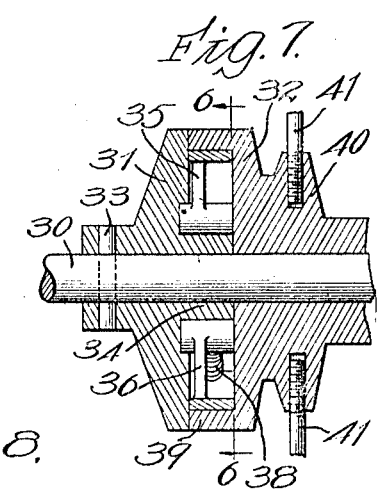
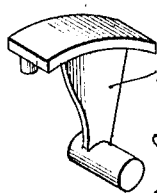

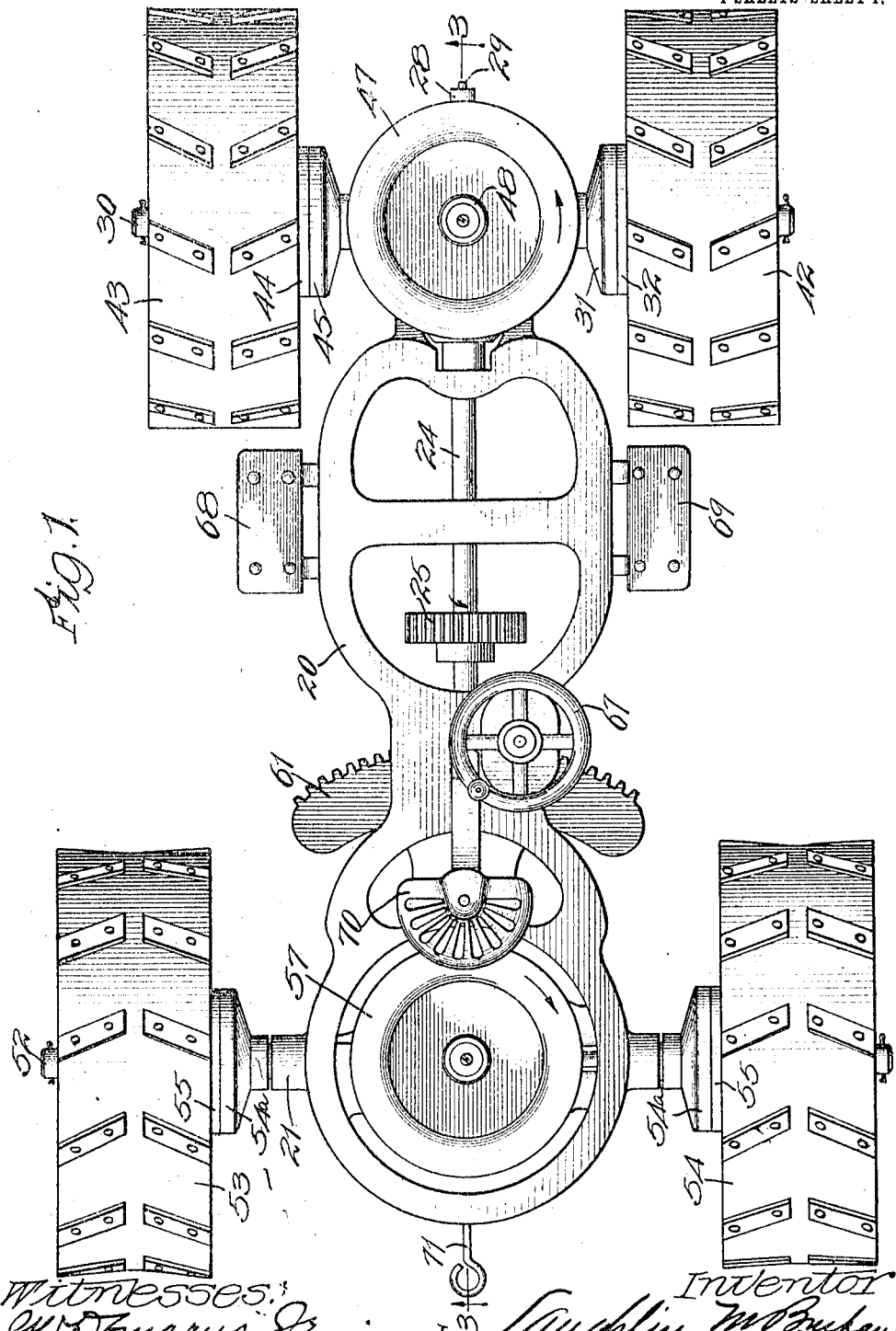

L. M. BUCHANAN.
MOTOR VEHICLE.
APPLICATION FILED FEB. 26, 1913.
1,090,132.
Patented Mar. 17, 1914.
4 SHEETS—SHEET 3.
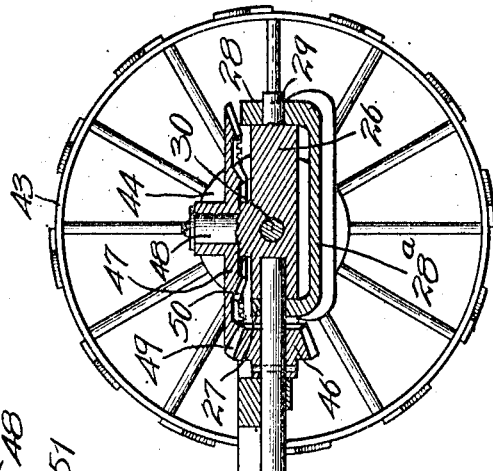
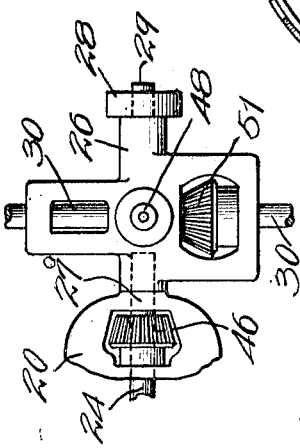
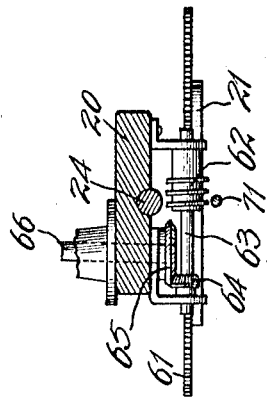
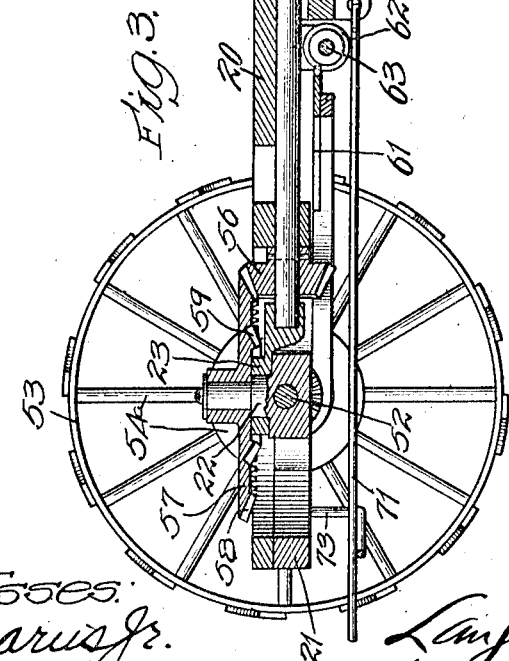
Witnesses:
Inventor:

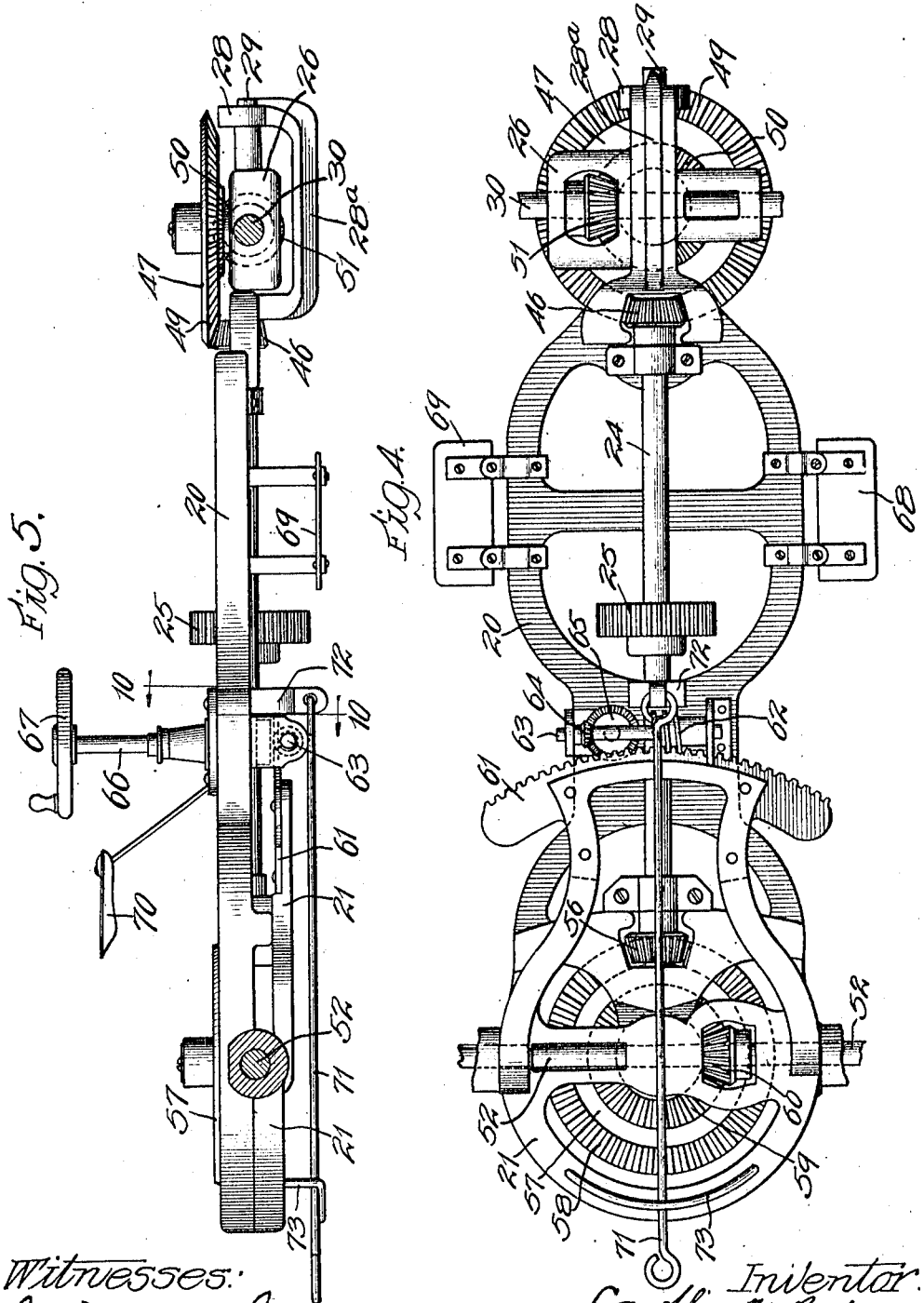

UNITED STATES PATENT OFFICE.

LAUGHLIN M. BUCHANAN, OF KEWANEE, ILLINOIS.

MOTOR-VEHICLE.

1,090,132. Specification of Letters Patent. Patented Mar. 17, 1914.

Application filed February 26, 1913. Serial No. 750,830.

*To all whom it may concern:*

Be it known that I, LAUGHLIN M. BUCHANAN, a citizen of the United States, residing at Kewanee, in the county of Henry and State of Illinois, have invented certain new and useful Improvements in Motor-Vehicles, of which the following is a specification, reference being had to the accompanying drawings.

This invention relates to motor vehicles and has for one of its objects the provision of improved driving means, by reason of which the engine is always capable of positively driving two or more of the wheels simultaneously.

It is another object of my invention to provide a new and improved construction and arrangement of chassis by reason of which the front and rear axles may have a vertical swinging movement relative to each other without interfering with the positive driving of either or both of said axles.

It is another object of my invention to provide a form of motor vehicle in which the power can be properly applied to the front wheels, either by means of the clutch connections shown or in any other suitable manner.

It is another object of my invention to provide means for properly driving wheels which are pivotally mounted upon a vertical axis relative to the frame of the machine, either by the use of clutch connections such as are shown in the drawings or by the use of any other suitable driving means.

It is another object of my invention to improve devices of this type in sundry details hereinafter pointed out.

The means by which I have accomplished these objects are illustrated in the accompanying drawings and are hereinafter specifically described.

That which I believe to be new is set forth in the claims.

In the drawings, Figure 1 is a top or plan view of the chassis of my improved machine with the driving wheels in position thereon; Fig. 2 is an end view of the same as seen from the right in Fig. 1; Fig. 3 is a section taken on line 3—3 of Fig. 1; Fig. 4 is a bottom plan view of the chassis of the machine. Fig. 5 is a side view of the parts shown in Fig. 4; Fig. 6 is an enlarged detail of one of the clutches by which the wheels are connected to the axles, being a section taken on line 6—6 of Fig. 7; Fig. 7 is substantially a section taken on line 7—7 of Fig. 6; Fig. 8 is a still more enlarged detail of one of the dogs by which the two members of the clutch are caused to rotate together; Fig. 9 is a top view of the member of the frame which carries the front wheels, with broken-away portions of other parts; and Fig. 10 is substantially a section on line 10—10 of Fig. 5.

Referring to the several figures of the drawings in which corresponding parts are indicated by the same reference characters, 20 indicates the main frame of the machine. 21 indicates the supporting frame for the rear wheels, said frame 21 being provided with a king-bolt 22 which extends upward through a suitable opening through a boss 23 forming a part of the main frame 20. In the construction shown, the king-bolt 22 is in the form of a pin or stud formed integral with the frame 21. The frame 21 and the adjacent portions of the frame 20 constitute in substance a circle or fifth wheel of the ordinary type.

24 indicates a shaft journaled in a central longitudinal position in said frame 20, being provided with a gear 25 keyed or otherwise fixed thereon, by means of which power is to be applied to said shaft from an engine of any suitable type mounted upon the frame 20 or in any other suitable position.

26 indicates a frame mounted between oppositely-disposed bars or plates 27—28 which form integral parts of the frame 20.

As best shown in Figs. 3 and 9, the rear side of the frame 26 is journaled upon the front end of the shaft 24 and the forward side of said frame 26 is provided with a pin or stud 29 which is journaled in a suitable opening through the plate 28. The parts referred to as plates or bars 27—28 are connected by a depressed bridge piece or section 28ᵃ (see Figs. 3, 4 and 5) that lies enough below the frame 26 so as not to interfere with the free rocking of such frame 26 on its pivots that are formed in the construction shown by the front end of the shaft 24 and the stud 29.

30 indicates a shaft journaled in the frame 26.

As best shown in Fig. 2, 31—32 indicate two members of a clutch mounted upon one end of the shaft 30, the member 31 being fixed in position thereon by means of a pin 33 or in any other suitable manner.

As best shown in Figs. 6 and 7, the member 31 is provided with a hub portion 34 upon which are pivotally mounted two dogs 35—36 which are yieldingly pressed by means of springs 37—38 into contact with an annular flange 39 forming a part of the member 32. As will be readily understood, when the shaft 30 and hub 34 are driven in the direction indicated by the arrow in Fig. 6, the dogs 35—36 will be pressed by the springs 37—38 into close contact with the flange 39 whereby the member 32 of the clutch is frictionally driven in the same direction. When however the shaft 30 and hub 34 are driven in the reverse direction, the dogs 35—36 are moved, against the pressure of the springs 37—38, out of operative contact with the flange 39, whereby the member 32 is not driven in said reverse direction by said shaft 30.

As shown in Fig. 7, the clutch member 32 has formed integral with it a hub 40 in which the spokes 41 of the wheel 42 are mounted. It will be readily understood that the wheel 43 is provided with a hub similar to the hub 40, with which hub the clutch member 44 is integrally connected. 45 indicates the clutch member coöperating with the member 44 in the same manner that the clutch member 31 coöperates with the clutch member 32, the arrangement being such that when under normal conditions the member 31 is driving the member 32 of the one clutch, the member 45 is likewise driving the member 44 of the other clutch.

46 indicates a beveled gear mounted upon the forward end of the shaft 24.

47 indicates a large gear journaled upon the pin 48 which is formed integral with the frame 26. Said gear 47 is provided with two concentric sets of gear teeth 49—50, the former of which meshes with the gear 46 and the latter of which two sets of gear teeth meshes with a beveled gear 51 keyed or otherwise fixed upon the shaft 30. By reason of the construction just described, in which the gear 46 is concentric with the axis upon which the frame 26 is journaled upon the frame 20, the engagement of the gear 46 with the gear teeth 49 of the gear 47 is maintained properly at whatever angle the frame 26 stands relative to the frame 20. This manner of mounting the front axle of the machine provides a very flexible connection between the axle and the frame to accommodate the unevenness of the road, while at the same time maintaining the driving at uniform efficiency.

As shown in Figs. 3, 4 and 5, 52 indicates the rear shaft suitably journaled in the frame 21. 53—54 indicate the rear wheels each of which has fixed upon it a clutch member 55 corresponding to the clutch member 32 of the wheel 42, and a clutch member 55ª is fixed upon said shaft 52 corresponding to the clutch member 31 of said wheel 42. The clutches 55—55ª are arranged to be operative to drive the wheels when the shaft 52 is rotating in clockwise direction in Figs. 3 and 5.

Referring to Figs. 3 and 4, 56 indicates a beveled gear keyed or otherwise fixed upon the rear end of the shaft 24. 57 indicates a gear mounted upon the upper end of the pin 22 and fixed in position thereon, serving to hold the frame 21 in proper contact with the frame 20. The gear 57 is provided with two sets of gear teeth 58 and 59, the former of which meshes with the beveled gear 56, and the latter of which sets of gear teeth meshes with a beveled gear 60 keyed or otherwise fixed upon the shaft 52.

It will be seen from the foregoing description that, when power is applied to the gear 25 to drive the shaft 24 in the direction indicated by the arrow on said shaft adjacent to said gear in Figs. 1 and 3, the gear 57 will be rotated in clockwise direction in Fig. 1 and the gear 47 will be rotated in anti-clockwise direction in said figure, as indicated by the arrows on said gears in Fig. 1, serving to drive both of the shafts 30 and 52 in clockwise direction in Fig. 3, the clutches serving to cause the wheels 42—43—53—54 to rotate in a clockwise direction in Fig. 3 for driving the machine forward. It will be understood that the gear 46 is made the same size as the gear 56. The gear 51 is the same size as the gear 60 and the gears 47 and 57 are similar in size and construction. The result is that when the machine is driven forward in a direct line power is transmitted evenly to all four wheels giving the ideal drive under such conditions.

61 indicates a segment of a worm gear secured by rivets or in any other suitable manner to the front end of the frame 21.

As best shown in Figs. 3 and 4, 62 indicates a worm keyed or otherwise fixed upon a short shaft 63 journaled on the lower face of the frame 20, said worm 62 meshing with the worm gear segment 61. 64 indicates a beveled gear keyed or otherwise fixed upon one end of the shaft 63, meshing with which there is another beveled gear 65 mounted upon the lower end of a steering post 66 which is suitably journaled upon the frame 20.

It will be understood that through the use of the hand-wheel 67 mounted upon the upper end of the steering post 66 the shaft 63 may be rotated through the medium of the beveled gears 64—65 whereby the segment 61 may be shifted laterally of the machine through the engagement of the worm 62 with the segment, such movement of the segment 61 causing the frame 21 to turn upon the pin or king-bolt 22 and properly move the wheels 53—54 to control the direction of movement of the machine. Inasmuch as the gear teeth 58 which mesh with the gear 56 are concentric about the king-bolt 22, the shifting of the frame 21 does not affect the meshing of the gear 56 with said gear teeth 58.

68—69 indicate steps suitably mounted upon the frame 20, and 70 indicates a seat supported on said frame.

71 indicates a draw-bar pivotally mounted upon the bracket 72 depending from the frame 20. 73 indicates a bracket adapted to support the rear end of said bar 71.

As is set forth above, when the machine is being driven forward in a direct line all four wheels are driven uniformly. When however the frame 21 is turned by means of the steering post 66 and hand-wheel 67 so as to cause the machine to proceed in an arc of a circle, the wheel which is on the inside of said arc and which is rotating at the slowest rate of speed relative to the speed of movement of the machine is for the time being caused to do all of the driving, the other wheels being adapted to rotate at an increased rate of speed by reason of the clutch connection between said wheels and said shaft. In case one of the drive wheels of the machine should fall into a rut in such a way that the wheel on the opposite end of the same axle was unable to grip the ground properly to draw the machine out of such position, then the wheel or wheels mounted upon the other axle upon which the weight of the machine was thrown would serve to drive the machine forward out of the rut. In other words, by my device I have provided a drive which is sure in its action in whatever position the machine may be, so long as the weight is resting upon the wheels.

In the use of my construction it is impossible for one wheel to remain stationary and for the other to be rotated at double speed, as in the case of the ordinary differential.

It will be understood that I do not wish to limit myself, except as hereinafter specifically claimed, to a construction in which the gears 51 and 60 are of the same size, in which the gears 47 and 57 are similar in size or construction, in which the axles 30 and 52 are driven at the same speed of rotation, or in which the wheels 42—43—53—54 are all driven at the same speed of rotation. It will be understood, however, that in the construction shown when the machine is being driven forward in a direct line each wheel is being driven at the same effective speed so as to tend normally to force the machine forward at approximately the same rate as that at which each of the other wheels tends to force the machine forward.

It will of course be understood that I do not limit my invention to use with any particular type of motor vehicle, the same being adapted for use with automobiles,—either pleasure cars or trucks,—with traction engines, or with motor vehicles of any other type.

What I claim as my invention and desire to secure by Letters Patent is,—

1. In a motor vehicle, the combination of a frame, carrying wheels journaled thereon, a drive shaft mounted therein, two transversely-extending shafts located concentrically with the front and rear wheels respectively, a gear fixed upon each of said two last-named shafts, two gears fixed upon said drive shaft, a gear provided with two sets of gear-teeth one of which sets meshes with one of the gears on said drive shaft and the other of which sets of gear-teeth meshes with the gear on one of said transverse shafts, another gear provided with two sets of gear-teeth one of which sets meshes with the other of said gears on said drive shaft and the other of which sets of gear-teeth meshes with the gear on the other of said transverse shafts, and a plurality of clutches interposed between said transverse shafts and said wheels, one for each wheel, adapted to cause each of said wheels to rotate at a speed to coöperate effectively with the other wheels to drive the vehicle forward when said drive shaft is driven in one direction.

2. In a motor vehicle, the combination of a frame, a drive shaft mounted on said frame, a second frame mounted on said first-named frame upon a pivotal axis coinciding with the axis of rotation of said drive shaft, a pair of carrying wheels journaled upon said second frame, gearing carried by said second frame having connections with said wheels, a gear fixed upon said drive shaft, means for driving said drive shaft, and a gear carried by said second frame meshing with the gearing having connections with said wheels and meshing with the gear fixed upon said drive shaft.

3. In a motor vehicle, the combination of a frame, a drive shaft mounted on said frame, a second frame mounted on said first-named frame upon a pivotal axis coinciding with the axis of rotation of said drive shaft, a pair of carrying wheels journaled upon said second frame, gearing carried by said second frame having clutch connections with said wheels, a gear fixed upon said drive shaft, means for driving said drive shaft, and a gear provided with two sets of gear-teeth carried by said second frame one of which sets of gear-teeth meshes with the gearing having clutch connections with said wheels and the other of which sets of gear-teeth meshes with the gear fixed upon said drive shaft.

4. In a motor vehicle, the combination of a frame, a drive shaft mounted on said frame, a second frame journaled upon said drive shaft, a pair of carrying wheels journaled upon said second frame, gearing carried by said second frame having clutch connections with said wheels, a gear fixed upon said drive shaft, means for driving said drive shaft, and a gear carried by said second frame meshing with the gearing having clutch connections with said wheels and meshing with the gear fixed upon said drive shaft.

5. In a motor vehicle, the combination of a frame, a drive shaft mounted on said frame, a second frame journaled at one side upon said drive shaft and at the other side upon said first frame, a pair of carrying wheels journaled upon said second frame, gearing carried by said second frame having clutch connections with said wheels, a gear fixed upon said drive shaft, means for driving said drive shaft, and a gear carried by said second frame meshing with the gearing having clutch connections with said wheels and meshing with the gear fixed upon said drive shaft.

6. In a motor vehicle, the combination of a frame comprising an arm extending from the front end thereof, a second frame journaled between the main portion of said frame and the outer end of said frame, a drive shaft journaled in said first-mentioned frame in alinement with the axis upon which said second frame is journaled, carrying wheels mounted on said second frame, gearing carried by said second frame having connections with said wheels, a gear fixed upon said drive shaft, means for driving said drive shaft, and a gear journaled upon said second frame upon a vertical axis passing through the horizontal axis upon which said wheels are journaled, said last-named gear meshing with the gearing connected with said carrying wheels and meshing with the gear fixed upon said drive shaft.

7. In a motor vehicle, the combination of a frame comprising an arm extending from the front end thereof, a second frame journaled between the main portion of said frame and the outer end of said arm, a drive shaft journaled in said first-mentioned frame in alinement with the axis upon which said second frame is journaled, a transversely-extending axle journaled in said second frame, carrying wheels mounted upon said axle and adapted to be driven thereby, a gear mounted upon said axle, a second gear fixed upon said drive shaft, means for driving said drive shaft, and a third gear member journaled upon a stud rising from said second frame in the vertical plane passing through said axle, said third gear member meshing with said first-mentioned gear and with said second gear.

LAUGHLIN M. BUCHANAN.

Witnesses:
ALBERT H. ADAMS,
W. H. DE BUSK.